(12) United States Patent
Pires (10) Patent No.: US 11,895,022 B2
(45) Date of Patent: Feb. 6, 2024

(54) METHOD FOR BROADCASTING INFORMATION PACKETS TO A PLURALITY OF RECIPIENTS IN A NETWORK

(71) Applicant: BULL SAS, Les Clayes-sous-Bois (FR)

(72) Inventor: Alexis Pires, Colomiers (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 17/586,684

(22) Filed: Jan. 27, 2022

(65) Prior Publication Data

US 2022/0247675 A1 Aug. 4, 2022

(30) Foreign Application Priority Data

Jan. 29, 2021 (EP) .................................... 21305114

(51) Int. Cl.
*G06F 15/16* (2006.01)
*H04L 45/00* (2022.01)
(Continued)

(52) U.S. Cl.
CPC ............ *H04L 45/566* (2013.01); *H04L 45/42* (2013.01); *H04L 45/745* (2013.01)

(58) Field of Classification Search
CPC ..... H04L 45/745; H04L 45/42; H04L 45/566; H04L 45/7452; H04L 45/7459
(Continued)

(56) References Cited

U.S. PATENT DOCUMENTS 7,379,433 B1 * 5/2008 Patel ..................... H04W 60/00
370/312
2007/0058629 A1 3/2007 Luft
(Continued)

FOREIGN PATENT DOCUMENTS

CA 2428456 A1 * 12/2003 ............. G06F 21/53
EP 3252976 A4 * 8/2018 ............ H03M 13/09

OTHER PUBLICATIONS

Optimization design of the decoder of streaming media player based on ARM Jin Chen; Zhiyong Mo; Xueli Chen; Baobing Pang 2017 IEEE 2nd Advanced Information Technology, Electronic and Automation Control Conference (IAEAC) Year: 2017 | Conference Paper | Publisher: IEEE (Year: 2017).*
(Continued)

*Primary Examiner* — Oscar A Louie
*Assistant Examiner* — Oluwatosin M Gidado
(74) *Attorney, Agent, or Firm* — ARC IP Law, PC; Joseph J. Mayo (57) ABSTRACT

A method of broadcasting an information packet in a network including a sender of the packet and a plurality of recipients connected by a network equipment of a routing server, the routing server including a physical computing system and a software system, and the physical computing system operating alternatively between a kernel mode and a user mode. The software system controls the implementation of a step of receiving the packet, and, for each recipient, a step of duplicating the packet. The software system also controls the implementation of a step of routing the packet thanks to an IP address of the recipient, and a step of sending the packet to the recipient, wherein each step is executed by the physical computing system in kernel mode.

13 Claims, 3 Drawing Sheets

(51) Int. Cl.
*H04L 45/42* (2022.01)
*H04L 45/745* (2022.01)

(58) Field of Classification Search
USPC .......................................................... 709/238
See application file for complete search history.

(56) References Cited

U.S. PATENT DOCUMENTS

| | | | |
|---|---|---|---|
| 2008/0311855 A1* | 12/2008 | Manousakis | H04W 28/06 |
| | | | 455/67.11 |
| 2016/0043992 A1* | 2/2016 | Henry | H04W 88/182 |
| | | | 709/245 |
| 2018/0048540 A1* | 2/2018 | Zhang | H04L 61/5014 |
| 2018/0123950 A1* | 5/2018 | Garg | H04L 47/18 |
| 2022/0311643 A1* | 9/2022 | Chundu | H04L 45/66 |

OTHER PUBLICATIONS

Eliminating the threat of kernel stack overflows 2008 IEEE International Conference on Information Reuse and Integration (pp. 116-121) Yair Wiseman • Joel Isaacson • Eliad Lubovsky (Year: 2008).*
European Search Report issued in EP21305114.7, dated Jul. 21, 2021 (11 pages).
Stender, Andrej, "Nftables—Packet Flow and Fetfilter Hooks in Detail"; May 17, 2020; pp. 1-10.
Gorman, Paul, "Nftables", Netfilter.org Documentation; Jan. 31, 2018.
Anonymous: "Man page of NFT", Jan. 5, 2020, pp. 1-32.

* cited by examiner

METHOD FOR BROADCASTING INFORMATION PACKETS TO A PLURALITY OF RECIPIENTS IN A NETWORK

This application claims priority to European Patent Application Number 21305114.7, filed 29 Jan. 2021, the specification of which is hereby incorporated herein by reference.

BACKGROUND OF THE INVENTION

Technical Field of the Invention

The invention relates to the field of broadcasting information packets to a plurality of recipients in a network.

Description of the Related Art

Figure 1:
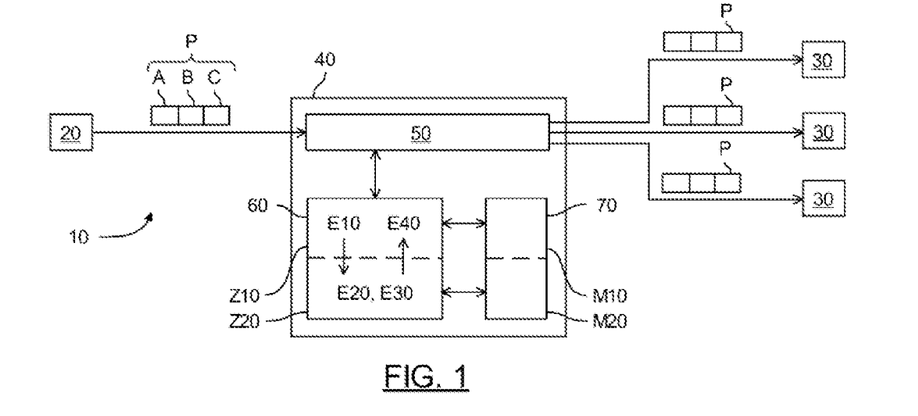
FIG. 1 is a schematic representation of the centralized type broadcasting method according to the prior art.

In a known manner, FIG. 1 depicts a network 10 comprising a sender 20 of information and a plurality of recipients 30, each identified by an IP address in the network 10 and connected by a set of routers and switches (not shown). The information, such as a video stream or an audio stream, is broadcast by the sender 20 in the network 10 in the form of streams comprising several packets P. Each packet P comprises payload data C, which together form the information to be broadcast, as well as metadata, which notably allows the routing of the packet P, such as a source IP address A and a destination IP address B. A single packet P is shown in FIG. 1 as an example.

FIG. 1 illustrates a centralized type of broadcast in which the network 10 further comprises a routing server 40 comprising a network equipment 50 connected, on the one hand, to the sender 20, and on the other hand, to each recipient 30. The routing server 40 further comprises a physical computing system 70, such as a processor, and a software system 60 configured to consume the physical computing system 70. The software system 60 typically comprises an operating system, known by its acronym "OS", and a set of third-party application components, such as programs. As illustrated in FIG. 1, the software system 60 is configured to control the receipt E10 of the packet P from the sender 20 and its redistribution to each recipient 30. The redistribution of the packet P comprises, for each recipient 30, the processing and then the sending E40 of the packet P, the processing being implemented by duplication E20 and routing E30 of the packet P thanks to the IP address of the recipient 30. The different steps E10, E20, E30, E40 are executed by the physical computing system 70. It should be noted that the term "routing" used here and throughout the document refers to application routing, namely the choice of the IP address of the recipient 30 based on application metadata.

In a known manner, as illustrated in FIG. 1, the software system 60 and the physical computing system 70 have two distinct operating zones and operating modes, respectively. Specifically, the software system 60 has a kernel zone Z10 and a user zone Z20. The physical computing system 70 has a kernel mode M10 and a user mode M20. With reference to FIG. 1, the steps of receiving E10 and sending E40 the packet P are executed in kernel mode M10, while the steps of duplicating E20 and routing E30, of a more complex nature, need to be executed in user mode M20. Indeed, the kernel zone Z10 allows full access to the physical computing system 70, which enables privileged operations to be performed. The kernel mode M20 is controlled and consumed exclusively by the kernel zone Z10, for basic and elementary tasks. The user zone Z20 allows only restricted access to the physical computing system 70, but is freely accessible by all programs. The user mode M20 allows for more complex operations.

In practice, the kernel zone Z10 and the user zone Z20 of the software system 60 are partitioned and a system interrupt is required to move from one zone to the other, namely between the steps of receiving E10 and duplicating E20 and between the steps of routing E30 and sending E40. The same applies to the kernel mode M20 and the user mode M20 of the physical computing system 70. Such system interruptions are costly in terms of time and resources, which increases the latency time, that is, the time to deliver the packet P to the recipients 30. Such latency is undesirable because it can affect the responsiveness and decision-making of recipients 30 in the context of real-time information dissemination, particularly in the context of a resource-constrained routing server 40. In addition, latency is likely to vary from one recipient 30 to another, which may result in different decision-making by recipients.

By way of example, in the military domain, access to real-time aerial data is a major asset for ground units on a mission. For this purpose, it is known to equip a drone with a video camera that is data-linked to the ground units, so as to train the sender 20 and the recipients 30 respectively. The aerial data is broadcast as packets P to a routing server 40 carried by one of the ground units for redistribution to each ground unit. In practice, the routing server 40 must therefore be mobile, light and robust, which means that it has limited resources. In such a context, the latency caused by system interruptions can compromise the success of the mission, for example by warning of a danger too late or by inducing desynchronization between ground units.

Incidentally, in the field of private networks, another type of broadcasting is known, called IP multicast, in which the redistribution of the packet is ensured directly by the routers and switches of the network, to which the recipients subscribe in order to receive the desired information stream. Such broadcasting is effective but cannot be used for public networks. Indeed, this would require configuring all the routers and switches located between the sender and the recipients, which infrastructure providers generally do not allow because the equipment is shared. An immediate solution would be to add a local network on top of the existing network by implementing link layer encapsulation. However, this would add additional metadata and processing, causing latency.

It is also known to use peer-to-peer broadcasting, in which the sender broadcasts an information stream directly and separately to each of the recipients. Such a broadcast has a low scalability, namely it is very efficient for broadcasting with a single recipient but is not adapted for group broadcasting and also induces a high latency.

The invention is thus aimed at a method of broadcasting information packets to a plurality of recipients in a network, which enables the latency to be reduced without increasing the required resources.

BRIEF SUMMARY OF THE INVENTION

One or more embodiments of the invention relates to a method of broadcasting at least one information packet in a network, said network comprising at least one sender of said packet, a plurality of recipients and at least one routing server comprising at least one network equipment which is connected to the sender and to each of the recipients, said routing server comprising at least one physical computing system and at least one software system configured to control the physical computing system, said physical computing system being configured to operate alternately between a full-access kernel mode and a restricted-access user mode, each recipient being identified by an IP address previously transmitted to the software system via the network equipment, said software system controlling the implementation of:

a step of receiving the packet from the sender,
and, for each recipient:
a step of duplicating the packet,
a step of routing the packet thanks to the IP address of said recipient, and
a step of sending the packet in order to broadcast it to the recipient,
the reception step and the sending step being executed by the physical computing system in kernel mode.

One or more embodiments of the invention are notable in that the duplication step and the routing step are performed by the physical computing system in kernel mode.

Thanks to one or more embodiments of the invention, the latency time of an information packet, namely the time elapsing between the date of transmission of the packet by a sender and its date of reception by a recipient, is reduced, in particular for a large number of recipients. This time-saving is the result of processing the packet in the routing server, which is advantageously performed by the physical computing system in kernel mode rather than in user mode as in the prior art. Thus, the physical computing system is used in kernel mode for each of the reception, duplication, routing and sending steps, which eliminates the need to perform multiple time-consuming system interruptions to switch from one mode to the other, the kernel and user modes being partitioned. In addition, such a broadcasting method makes it possible to decrease latency in resource-constrained networks, such as in the military domain for broadcasting real-time aerial data to ground units, without requiring any increase of resources.

According to one or more embodiments of the invention, the software system comprises a kernel zone and a user zone configured to alternately control the physical computing system, the receiving step, the duplicating step, the routing step and the sending step being controlled by the kernel zone of the software system.

One or more embodiments of the invention advantageously diverts the use of the kernel zone of the software system, previously reserved for the input and output operations of the routing server, to the processing operations of the information packet. Such a second use of the kernel zone is not intuitive for the person skilled in the art because the kernel zone offers only basic and very limited functions, which complicates and restricts the processing of information packets.

According to one or more embodiments of of the invention, all the steps of the broadcasting method are executed by the physical computing system in kernel mode. In other words, between the receiving step and sending step, the broadcasting method does not require any system interruption. This advantageously maximizes the time saved distributing the packet to each recipient.

According to one or more embodiments of invention, the broadcasting method is free, between the reception step and the sending step, of packet processing step other than the duplication and routing steps. The use of the kernel zone does require restricting the processing of the packet to basic, simple and essential functions, namely the duplication and routing steps. The method according to one or more embodiments of the invention thus allows for fast, basic broadcasting of information packets in a constrained environment.

According to one or more embodiments of the invention, during the routing step, the packet comprising data and a destination address, the IP address of the recipient is added into the destination address of the packet. The processing of the packet is thus implemented by generating a duplicate and by specifying therein the destination address for each recipient, in a fast and simple way.

According to one or more embodiments of the invention, the duplication step generates a so-called duplicated packet from a so-called original packet, the sending step being implemented with the duplicated packet, within the framework of a point-to-point type broadcast.

According to one or more embodiments of the invention, the software system comprises a Netfilter framework, the duplication step and/or the routing step being controlled by the Netfilter framework. The term "framework" refers to a software infrastructure. One or more embodiments of the invention thus proposes the judicious use of the Netfilter framework to enable control of the implementation of the duplication step and/or the routing step in kernel mode.

According to one or more embodiments of the invention, the software system comprises a Netfilter framework comprising an nftables module, the duplication and routing steps being controlled by the nftables module. The nftables module has the advantage of allowing the implementation of routing and duplication steps in kernel mode in a fast and easy way.

According to one or more embodiments of the invention, the nftables module implements, for each recipient, the duplication step and the routing step from a same rule associated with said recipient. Executing a single rule makes it possible to optimize the processing of the packet.

In one or more embodiments of, the routing step is implemented before the duplication step. The broadcasting method of the invention thus violates the traditional order of steps to adapt to the constraints of the kernel zone. Indeed, the kernel zone entails using only basic functions, unlike the user zone, and considers the duplication in particular to be a terminal action within a rule.

According to one or more embodiments of the invention, the software system comprises a Netfilter framework comprising an iptables module, the duplication step being controlled by the iptables module. The iptables module has the advantage of being more widespread than the nftables module.

According to one or more embodiments of the invention, the physical computing system performs, for each recipient, the routing step using a container associated with said recipient. In at least one embodiment of the invention, the iptables module implements, for each recipient, the duplication step from a rule associated with said recipient. The use of a container advantageously makes it possible to carry out the processing of the packet while overcoming the limitations of the iptables module in terms of functions. Indeed, the container makes it possible to implement the routing that is not allowed by the rule in which the duplication is specified.

In one or more embodiments of the invention, the routing step is implemented after the duplication step. The use of a container advantageously allows the duplication and routing steps to be implemented in the same order as the traditional user mode.

In one or more embodiments of the invention, during the routing step, the packet comprising a source address, the address of the routing server is specified in the source address of the packet. This advantageously makes it possible to follow the security rules of the kernel zone and thus to avoid the destruction of the packet by the kernel zone.

According to one or more embodiments of the invention, during the receiving step, the network comprising a plurality of senders of at least one packet and the physical computing system having a port specific to each sender, the packet of a given sender is associated with the port specific to said given sender. This advantageously makes it possible to process packets from multiple senders in parallel.

One or more embodiments of the invention further relates to the combination of a broadcasting method as described above and a signaling step implemented prior to said broadcasting method during which the sender signals itself as such to the software system via the network equipment and each recipient transmits its IP address to receive the packet.

According to one or more embodiments of the invention, during the signaling step, the software system receives a signal from the sender, in order to prepare for the broadcasting of the packet. In at least one embodiment of the invention, the software system assigns its own port to said sender. In one or more embodiments of the invention, the Netfilter framework—the nftables module or the iptables module—implements a rule to destroy the packet at the end of the broadcasting method.

According to at least one embodiment of the invention, during the signaling step, the software system receives a signal from each recipient, in order to prepare the broadcasting of the packet. In one or more embodiments of the invention, the Netfilter framework generates, for each recipient, a rule to enable the implementation of the duplication step and/or the routing step.

According to at least one embodiment of the invention, the nftables module of the Netfilter framework implements, for each recipient, a rule to allow the implementation of the duplication and routing steps.

According to one or more embodiments of the invention, the iptables module implements, for each recipient, a rule to allow the implementation of the duplication step. In at least one embodiment of the invention, the software system generates, for each recipient, a container to allow the implementation of the routing step.

BRIEF DESCRIPTION OF THE DRAWINGS

The invention will be better understood upon reading the following description, given by way of example, and referring to the following figures, given as non-limiting examples, in which identical references are given to similar objects.

It should be noted that the figures set forth the invention in detail to implement the invention, said figures of course being capable of being used to further define the invention where appropriate.

DETAILED DESCRIPTION OF THE INVENTION

One or more embodiments of the invention relates to a method of broadcasting centralized type information to a set of recipients in a network. More specifically, the invention relates to a method of broadcasting information of type:
  unicast, in which information is broadcast separately to each recipient,
  stateless, in which information is disseminated independently, and
  simplex, in which the information is unilaterally distributed to each recipient.

One or more embodiments of the invention relates to a UDP method of broadcasting information.

Figure 2:
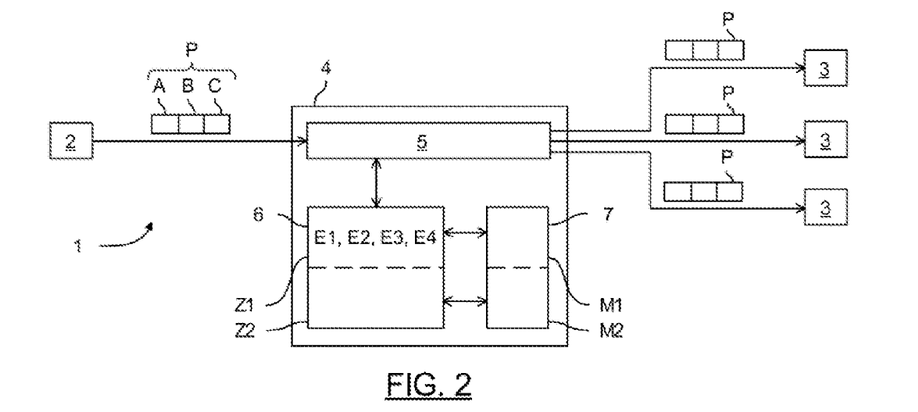
FIG. 2 is a schematic representation of a method of broadcasting information packets to a plurality of recipients in a network according to one or more embodiments of the invention.

With reference to FIG. 2 and as described in the preamble, there is shown a network 1 comprising a sender 2 of information, several recipients 3 and a routing server 4, all identified by their own IP address in the network 1. The routing server 4 comprises a network equipment 5 connected, on the one hand, to the sender 2, and on the other hand, to each recipient 3. The routing server 4 further comprises a physical computing system 7, such as a processor, and a software system 6. The software system 6 typically has an operating system, or "OS" for short, and a set of third-party application components, such as programs. The software system 6 is configured to control the receipt of information from the sender 2 and its redistribution to each recipient 3. More specifically, the software system 6 provides instructions to the physical computing system 7 which the latter executes. The network 1 of FIG. 2 designates, as a non-limiting example, a military type network in which the sender 2 takes the form of a drone equipped with a video camera in order to provide aerial data to a set of ground units, forming the recipients 3. The routing server 4 is mobile, so that it can be carried in a backpack or in a vehicle of one of the ground units.

With reference to FIG. 2 and as described in the preamble, the information is in the form of a video stream or an audio stream, in particular aerial data, and is broadcast by the sender 2 in the network 1 in the form of streams comprising several packets P. Each packet P contains payload data C, together forming the information to be broadcast, as well as metadata, in particular enabling the routing of the packet P, such as a source IP address A and a destination IP address B. A single packet P is shown in FIG. 2.

Still with reference to FIG. 2 and as described in the preamble, the software system 6 and the physical computing system 7 have two distinct operating zones and operating modes, respectively. More specifically, the software system 6 has a kernel zone Z1 and a user zone Z2. The physical computing system 7 has a kernel mode M1 and a user mode M2. The kernel zone Z1 allows full access to the physical computing system 7, which enables privileged operations to be performed. The kernel mode M1 is controlled and consumed exclusively by the kernel zone Z1, for basic and elementary tasks. The user zone Z2 allows only restricted access to the physical computing system 7, but is freely accessible by all programs. The user mode M2 allows for more complex operations. In practice, the kernel zone Z1 and the user zone Z2 of the software system 6 are partitioned, and it is necessary to perform a system interrupt to switch from one zone to the other. The same applies to the kernel mode M1 and the user mode M2 of the physical computing system 7.

A centralized type broadcasting network 1 with several recipients 3 is known to the person skilled in the art, so its architecture will not be described further.

One or more embodiments of the invention is described hereinafter in the context of the network 1 of the example in FIG. 2, in which a single sender 2 of a single packet P and three recipients 3 are shown for clarity. It goes without saying, however, that at least one embodiment of the invention applies to any number of packets P. It also goes without saying that at least one embodiment of the invention applies to a network 1 with any number of senders 2 and recipients 3, it being possible for a sender 2 to also be a recipient 3 and vice versa. Furthermore, the network 1 is in the example of FIG. 2 reduced to a routing server 4 with a single network device 5 and a set of senders 2 and recipients 3, but it goes without saying that the network 1 comprises any number of elements, such as routers and switches in particular.

According to one or more embodiments of the invention and with reference to FIG. 2, the broadcasting method comprises the following steps, the implementation of which is controlled by the software system 6 of the routing server 4:

a step of receiving E1 the packet P from the sender 2, and, for each recipient 3:
a step of duplicating E2 the packet P,
a step of routing E3 the packet P thanks to the IP address of said recipient 3, and
a step of sending E4 the packet P in order to broadcast it to the recipient 3,
all the reception E1, duplication E2, routing E3 and sending E4 steps being executed by the physical computing system 7 in kernel mode M1, and controlled by the kernel zone Z1 of the software system 6.

As will be described later, the IP address of each recipient 3 is transmitted to the routing server 4 in a signaling step prior to the broadcasting method. It should also be noted that the term "routing" used here and throughout the document refers to application routing, namely the choice of the IP address of the recipient 3 based on application metadata.

Thus, the kernel zone Z1 of the software system 6 is used to control the input and output operations of the routing server 4, namely, the reception E1 and sending E4 steps, but also to process the packet P, namely, the duplication E2 and routing E3 steps. The use of the kernel zone Z1 for processing the packet P advantageously allows system interruptions to be avoided, in particular after the reception step E1 and before the sending step E4, which makes it possible to significantly reduce the latency time of the packet P. This time-saving is achieved independently of the computing resources of the routing server 4 and is therefore of particular interest for a routing server 4 that is resource-constrained, such as in the military network previously described. In such a military network, the routing server 4 must be light, small and robust so that it can be easily carried in a vehicle or backpack.

In practice, the kernel mode M1 of the physical computing system 7 is only accessible through the kernel zone Z1 of the software system 6, which is restricted in terms of operations and only offers basic and elementary functions that are not suitable as such for processing the packet P. To overcome the limitations linked to the kernel zone Z1, at least one embodiment of the invention provides for the use of a software system 6 comprising a Netfilter framework and one of its modules: nftables or iptables. The term "framework" refers to a software infrastructure. The Netfilter framework and its nftables and iptables modules are assumed to be known per se to the person skilled in the art. However, it is recalled here that they are installed in the kernel zone Z1 of the software system 6 and are controlled from the user zone Z2. The Netfilter framework and its modules have predefined tables, such as a filter table and a network address translation (NAT) table by way of examples, as well as predefined packet life cycle events with strings attached. Strings make it possible to specify a set of rules and their sequencing, namely the order in which the rules are implemented. Such strings may be modified, created and deleted to generate various commands, which advantageously makes it possible in the context of one or more embodiments of the invention to control the processing of the packet P in a convenient and simple way, as will be presented later.

In the following, each step of the broadcasting method of at least one embodiment of the invention is described in more detail, firstly for a software system 6 having a Netfilter framework with an nftables module and, secondly, for a software system 6 comprising a Netfilter framework with an iptables module. It is specified that one or more embodiments of the invention, implemented with the Netfilter framework and its nftables or iptables modules, is not limited to the specified embodiments.

Figure 3:
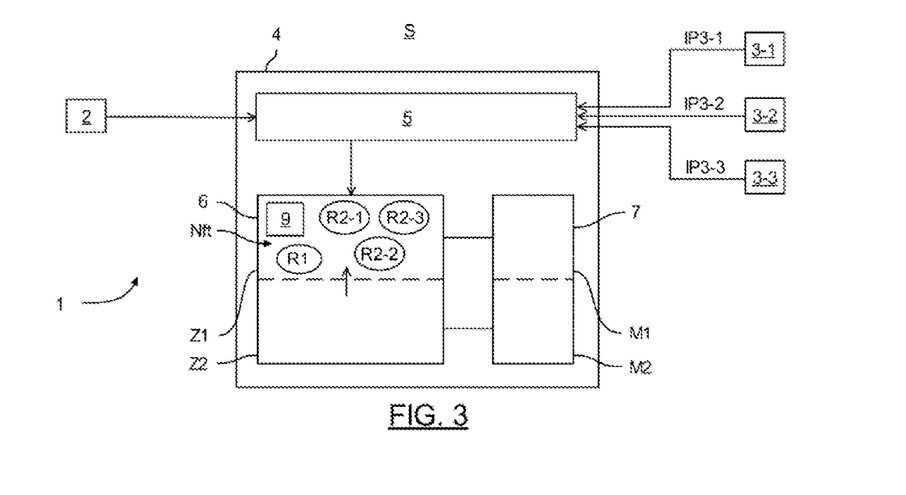
FIG. 3 is a schematic representation of a signaling step prior to the broadcasting method of FIG. 2 according to one or more embodiments of the invention implemented with an nftables module of the Netfilter framework.

With reference to FIG. 3 and as previously described, the broadcasting method is preceded by a signaling step S which makes it possible to prepare the broadcasting method. During the signaling step S, the sender 2 signals that it wishes to broadcast a packet P to the software system 6 of the routing server 4, via the network equipment 5. Similarly, each recipient 3-1, 3-2, 3-3 signals that it wishes to receive the packet P to the software system 6 and transmits its IP address IP3-1, IP3-2, IP3-3 for the routing step E3. In practice, the sender 2 generates a stream and each recipient 3-1, 3-2, 3-3 indicates that it wishes to subscribe to the stream generated by the sender 2. These signals allow the software system 6 to assign a port 9 to said sender 2 and to generate rules R1, R2-1, R2-2, R2-3 to allow the kernel zone Z1 to command the physical computing system 7 to perform the duplication E2 and routing E3 steps in kernel mode M1.

Specifically, as shown in FIG. 3, upon receiving the signal from the sender 2, the software system 6 assigns a port 9 that is dedicated to the sender 2, in this example for a UDP type stream. It is specified that in the case of multiple senders 2, the software system 6 thus assigns a port 9 to each sender 2, which is specific to it. In addition to assigning the port 9, the software system 6, using the nftables module Nft of the Netfilter framework in this example, generates a first rule R1 that controls the discarding of the packet P after the duplication E2 and routing E3 steps, as will be described laterin at least one embodiment of the invention, the first rule R1 is stored within a filtering type string, which is itself attached to prerouting type "hook" events.

Still referring to FIG. 3, upon receiving the signal from each recipient 3, the software system 6, using the nftables module Nft of the Netfilter framework in this example, generates, for each recipient 3-1, 3-2, 3-3, a second rule R2-1, R2-2, R2-3 that jointly controls the duplication E2 and routing E3 steps, as will be described later. In this example, three second rules R2-1, R2-2, R2-3 are thus created. In one or more embodiments of the invention, the second rules R2-1, R2-2, R2-3 are stored in the same string as the first rule R1 and in such a way that they are implemented before the first rule R1. In other words, the second rules R2-1, R2-2, R2-3 and the first rule R1 are stored successively within a filtering type string, itself attached to the prerouting type events.

At the end of the signaling step S, before implementing the broadcasting method, a port 9 is assigned to the sender 2 and the software system 6 has the IP address IP-1, IP-2, IP-3 of each recipient 3-1, 3-2, 3-3 subscribing to the sender 2's broadcast. Rules R1, R2-1, R2-2, R2-3 are also implemented thanks to the nftables module Nft to implement the processing of packet P in kernel mode M1. These are, on the one hand, second rules R2-1, R2-2, R2-3, each of which jointly ensures duplication and routing for a recipient 3-1, 3-2, 3-3, and, on the other hand, a first rule R1 ensuring the final discarding of the packet P.

In practice, the signaling step S is controlled by the user zone Z2 of the software system 6. Indeed, as described above, the Netfilter framework is located in the kernel zone Z1 but configured from the user zone Z2.

Figure 4:
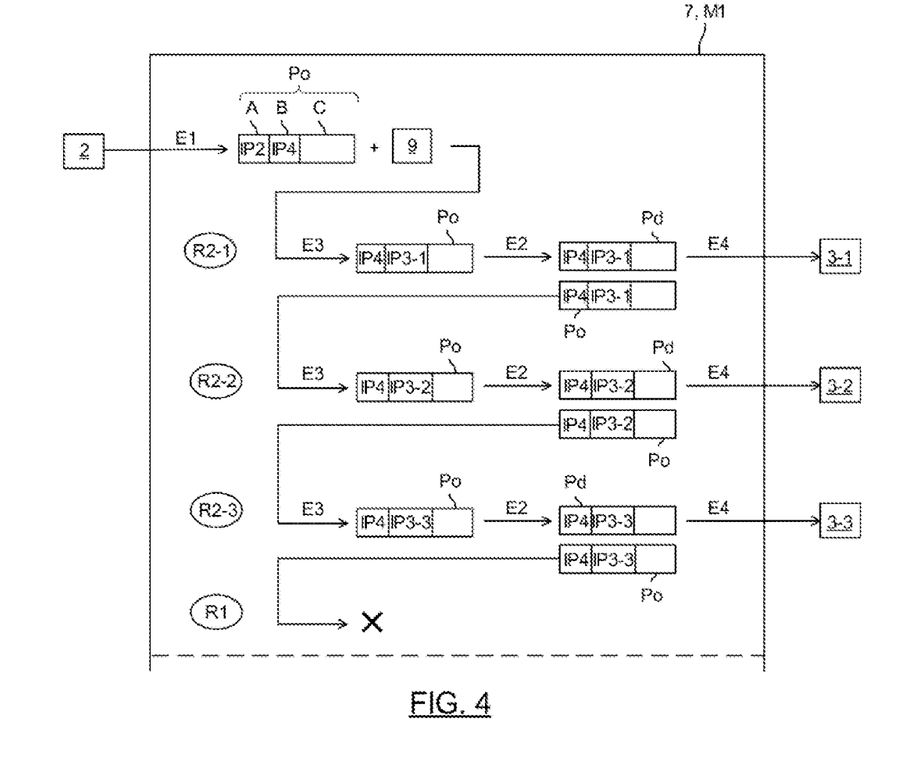
FIG. 4 is a schematic representation of the receiving, duplicating, routing and sending steps of the broadcasting method according to one or more embodiments of the invention in FIG. 3.

With reference to FIG. 4 and as previously described, the broadcasting method is implemented after the signaling step S and starts with a reception step E1. To implement the reception step E1, the network equipment 5 causes a system interrupt and switches the physical computing system 7 to the kernel mode M1. During the reception step E1, the physical computing system 7 is thus in kernel mode M1 and receives the packet P, which is associated with port 9. In the case of several packets P from the same sender 2, they are thus all associated with the same port 9. Furthermore, in the case of multiple packets P from different senders 2, each packet P is associated with the port 9 assigned to the sender 2 of said packet P. This advantageously makes it possible to broadcast multiple packets P from different senders 2 at the same time.

With reference to FIG. 4 and as previously described, after the reception step E1, the physical computing system 9 then implements the routing E3, duplication E2 and sending E4 steps for the first recipient 3-1, and then repeats this sequence for each recipient 3-2, 3-3. In this example, this sequence is thus repeated once for the second recipient 3-2 and a second time for the third recipient 3-3. All the routing E3, duplication E2 and sending E4 steps are implemented in the kernel mode M1 of the physical computing system 7. The processing of the packet P in kernel mode M1 is allowed thanks to the rules R1, R2-1, R2-2, R2-3 implemented by the nftables module Nft. This avoids the need for time-consuming system interruptions of the physical computing system 7 but requires basic processing of the packet P, in this example restricted solely to the steps of duplication E2 and routing E3.

More precisely, as illustrated in FIG. 4, the routing E3 and duplication E2 steps are controlled by the second rules R2-1, R2-2, R2-3 implemented during the signaling step S. For each recipient 3-1, 3-2, 3-3, the second rule R2-1, R2-2, R2-3 controls the implementation of the routing step E3 before that of the duplication step E2 which must be a final action in the context of the nftables framework Nft. Thus, the routing step E3 is implemented prior to the duplication step E2, namely in a manner that is inverted with respect to what is traditionally done, in order to allow the processing of the packet P in kernel mode M1 by means of a single rule R2-1, R2-2, R2-3, in a fast and simple manner.

The routing step E3, the duplication step E2 and the sending step E4 to the first recipient 3-1 controlled by the second rule R2-1 are described below.

As illustrated in FIG. 4, during the routing step E3, the source address A and the destination address B of the received packet P, referred to hereafter as the "original packet Po", are modified. The address IP4 of the routing server 4 is added into the source address A, instead of the address IP2 of the sender 2, in order to bypass the security mechanisms of the kernel zone Z1. The address IP3-1 of the first recipient 3-1 is then added into the destination address B, instead of the address IP4 of the routing server 4. The checksum, used to verify the integrity of the packet P, is recalculated at the end of the routing step E3 so that it corresponds to the IP metadata changes made previously. The choice of the filtering table to host the second rule R2-1 advantageously makes it possible to avoid the occurrence of a security mechanism during the sending step E4, linked to connection tracking, or "conntrack" for short.

As illustrated in FIG. 4, during the duplication step E2, a copy of the original packet Po is then made, known as the "duplicated packet Pd". The original packet PO and the duplicated packet Pd are strictly identical, namely they include the same data C and the same metadata. The step of sending E4 to the first recipient 3-1 is then carried out with the duplicated packet Pd, so as to keep the original packet Po for the rest of the broadcasting method.

As illustrated in FIG. 4, the second rule R2-2 associated with the second recipient 3-2 is executed following the second rule R2-1 associated with the first recipient 3-1. The routing step E3 and the duplication step E2 are implemented in the same way as before, except that the original packet Po used is the one kept at the end of the previous duplication step E2 and that the destination address B is modified with the address IP3-2 of the second recipient 3-2. The duplicated packet Pd obtained from the second rule R2-2 is then sent E4 to the second recipient 3-2. The same is then done for the third recipient 3-3. At the end of the duplication steps E2, the first rule R1 is further executed to discard the remaining original packet Po.

To summarize, with reference to FIGS. 3 and 4, the broadcasting method is fully implemented in the kernel mode M1 of the physical computing system 7 and controlled by the kernel zone Z1 of the software system 6, by executing rules R1, R2-1, R2-2, R2-3 implemented in the Netfilter nftables framework Nft available to the software system 6. The routing step E3 and the duplication step E2 are advantageously implemented by the same rule R2-1, R2-2, R2-3 in a fast and simple way, by cleverly implementing the duplication step E2 after the routing step E3.

At least one embodiment of the invention is described below in the context of a software system 6 equipped with a Netfilter framework with an iptables module, highlighting the differences with respect to the embodiment with the nftables module Nft.

Figure 5:
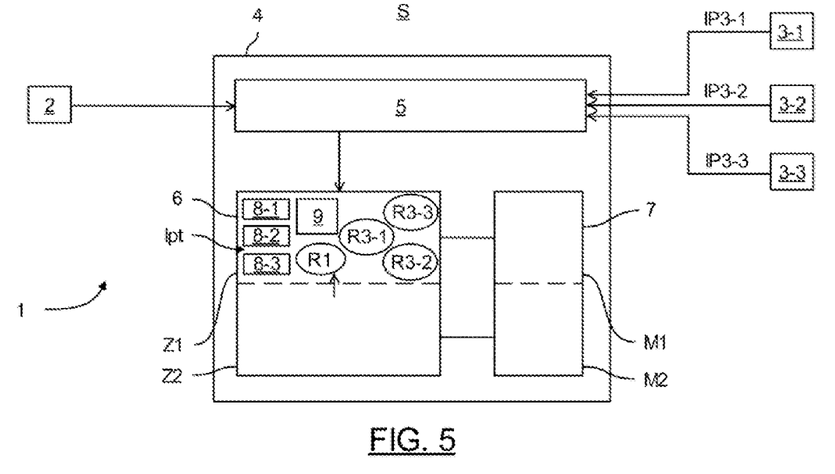
FIG. 5 is a schematic representation of a signaling step prior to the broadcasting method of FIG. 2 according to one or more embodiments of the invention implemented with an iptables module of the Netfilter framework.

With reference to FIG. 5, the signaling step S differs from the previous embodiment in that, upon receipt of the signal from each recipient 3-1, 3-2, 3-3, the software system 6, using the Netfilter iptables module Ipt in this example, generates a third rule R3-1, R3-2, R3-3 that controls only the duplication step E2. Furthermore, upon receiving the signal from each recipient 3-1, 3-2, 3-3, the software system 6 assigns, for each recipient 3-1, 3-2, 3-3, a container 8-1, 8-2, 8-3, in order to implement the routing step E3 therein. In this example, as before, three recipients 3-1, 3-2, 3-3 signal themselves so that three third rules R3-1, R3-2, R3-3 are created and three containers 8-1, 8-2, 8-3 are assigned. Thus, instead of implementing a single rule for the duplication step E2 and the routing step E3 for each recipient 3-1, 3-2, 3-3, the iptables module Ipt requires the use of containers 8-1, 8-2, 8-3 in order to be able to implement the routing step E3, overcoming the limitations of the kernel zone Z1. In at least one embodiment of the invention, the third rules R3-1, R3-2, R3-3 and the first rule R1 are stored successively in the prerouting string of a predefined iptables processing table, known as a mangle table. The implementation of the routing step E3 within containers 8-1, 8-2, 8-3 always within the kernel zone Z1 advantageously makes it possible to maintain the performance benefits. The routing step E3, in one or more embodiments of the invention, is implemented in stateless mode, in order to avoid the appearance of security mechanisms.

Figure 6:
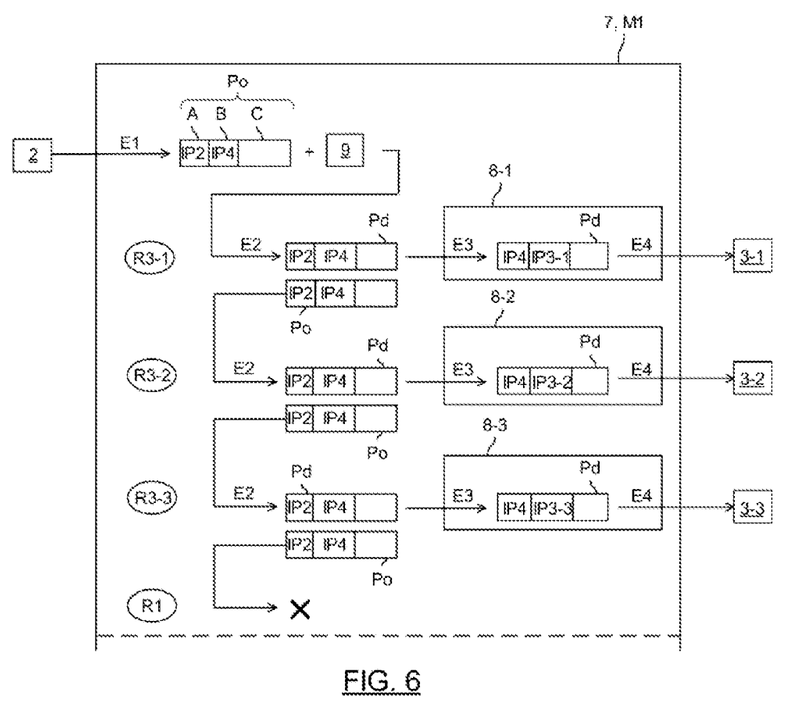
FIG. 6 is a schematic representation of the receiving, duplicating, routing and sending steps of the broadcasting method according to one or more embodiments of the invention in FIG. 5.

With reference to FIG. 6, the reception step E1 is identical to that of the first embodiment. On the other hand, the processing of the packet P differs in that, for each recipient 3-1, 3-2, 3-3, the duplication step E2 is implemented before the routing step E3 in the iptables framework Ipt. Unlike the nftables module Nft, which requires the duplication step E2 and the routing step E3 to be swapped, the iptables module Ipt advantageously allows the traditional order of processing of the packet P to be maintained. Moreover, unlike the nftables module Nft, only the duplication step E2 is implemented by means of a rule, the routing step E3 and the sending step E4 being implemented in the container 8-1, 8-2, 8-3 associated with the recipient 3-1, 3-2, 3-3 of the packet P.

To summarize, with reference to FIGS. 5 and 6, in the context of a software system 6 equipped with iptables Ipt, the processing of the packet P is implemented in the traditional way by duplication E2 and then routing E3. The kernel zone Z1 requires, on the one hand, a third rule R3-1, R3-2, R3-3 for duplication E2, and, on the other hand, a container 81, 8-2, 8-3 for routing E3.

The broadcasting method according to at least one embodiment of the invention thus advantageously makes it possible to process the packet P in kernel mode M1, by cleverly exploiting the limited functions of the kernel zone Z1, traditionally reserved for input and output operations. This advantageously avoids causing system interruptions to the physical computing system 7 and thus reduces latency, without increasing the resources of the routing server 4. Such a broadcast method is particularly advantageous in a resource-constrained network 1, such as in the military field.

What is claimed is:

1. A method of broadcasting at least one information packet in a network, said network comprising at least one sender of said at least one information packet, a plurality of recipients and at least one routing server comprising at least one network equipment which is connected to the at least one sender and to each recipient of the plurality of recipients, said at least one routing server comprising at least one physical computing system and at least one software system configured to control the at least one physical computing system, said at least one physical computing system being configured to operate alternately between a full-access kernel mode and a restricted-access user mode, said each recipient of the plurality of recipients being identified by an IP address previously transmitted to the at least one software system via the at least one network equipment, wherein via said at least one software system, said method comprises:
receiving the at least one information packet from the at least one sender, wherein said at least one information packet comprises an original packet with a video stream or an audio stream, wherein said original packet comprises
payload data comprising information to be broadcasted and metadata,
wherein to implement the receiving, said at least one network equipment causes a system interrupt of the at least one physical computing system and switches said at least one physical computing system to a kernel mode such that said receiving is executed in kernel mode by the at least one physical computing system,
for said each recipient of the plurality of recipients, while said at least one physical computing system remains in said kernel mode,
duplicating the at least one information packet, wherein said duplicating comprises generating a duplicated packet from said original packet and specifying therein a destination address of said each recipient,
routing the at least one information packet based on the IP address of said each recipient, wherein said IP address of said each recipient is previously chosen based on said metadata of said at least one information packet, and
sending the duplicated packet to said each recipient in order to broadcast the duplicated packet to said each recipient and keeping the original packet,
wherein the receiving and the sending are executed by the at least one physical computing system in said kernel mode without interruptions,
wherein the duplicating and the routing are executed by the at least one physical computing system in said kernel mode.

2. The method of broadcasting according to claim 1, wherein the at least one software system comprises a kernel zone and a user zone configured to alternately control the at least one physical computing system, the receiving, the duplicating, the routing and the sending being controlled by the kernel zone of the at least one software system.

3. The method of broadcasting according to claim 1, which, between the receiving and the sending, is free of any step of processing the at least one information packet other than the duplicating and the routing.

4. The method of broadcasting according to claim 1, wherein during the routing, the at least one information packet further comprising the destination address, the IP address of the each recipient is added in the destination address of the at least one information packet.

5. The method of broadcasting according to claim 1, wherein the at least one software system comprises a Netfilter framework comprising an nftables module, the duplicating and the routing being controlled by the nftables module.

6. The method of broadcasting according to claim 5, wherein the nftables module implements, for said each recipient, the duplicating and the routing from a same single rule associated with said each recipient, the routing being implemented before the duplicating.

7. The method of broadcasting according to claim 1, wherein the at least one software system has a Netfilter framework comprising an iptables module, the duplicating being controlled by the iptables module.

8. The method of broadcasting according to claim 7, wherein the at least one physical computing system performs, for said each recipient, the routing by means of a container associated with said each recipient, the routing being implemented after the duplicating.

9. The method of broadcasting according to claim 1, wherein the at least one software system has a Netfilter framework, wherein said Netfilter framework implements a rule to destroy said original packet after said duplicating and said routing of all of said each recipient of said plurality of recipients.

10. The method of broadcasting according to claim 1, wherein at an end of said routing, verifying an integrity of the at least one information packet to ensure the at least one information packet corresponds to the the IP address of said each recipient that is chosen from said metadata.

11. A method of broadcasting at least one information packet in a network, said network comprising at least one sender of said at least one information packet, a plurality of recipients and at least one routing server comprising at least one network equipment which is connected to the at least one sender and to each of the plurality of recipients, said at least one routing server comprising at least one physical computing system and at least one software system configured to control the at least one physical computing system, said at least one physical computing system being configured to operate alternately between a full-access kernel mode and a restricted-access user mode, each recipient of the plurality of recipients being identified by an IP address previously transmitted to the at least one software system via the at least one network equipment, wherein via said at least one software system, said method comprises:

receiving the at least one information packet from the at least one sender, wherein said at least one information packet comprises an original packet with a video stream or an audio stream, wherein said original packet comprises payload data comprising information to be broadcasted and metadata, wherein to implement the receiving, said at least one network equipment causes a system interrupt of the at least one physical computing system and switches said at least one physical computing system to a kernel mode such that said receiving is executed in kernel mode by the at least one physical computing system, for said each recipient of the plurality of recipients, while said at least one physical computing system remains in said kernel mode, duplicating the at least one information packet, wherein said duplicating comprises generating a duplicated packet from said original packet and specifying therein a destination address of said each recipient, routing the at least one information packet based on the IP address of said each recipient, wherein said IP address of said each recipient is previously chosen based on said metadata of said at least one information packet, and sending the duplicated packet in order to broadcast it to the each recipient and keeping the original packet, wherein the receiving and the sending are executed by the at least one physical computing system in said kernel mode without interruptions, wherein the duplicating and the routing are executed by the at least one physical computing system in said kernel mode;

wherein prior to said receiving, said method of broadcasting further comprises signaling, during which the at least one sender signals itself as such to the at least one software system via the at least one network equipment, and said each recipient transmits its IP address to receive the at least one information packet.

12. The method of broadcasting according to claim 11, wherein the at least one software system has a Netfilter framework, wherein said Netfilter framework implements a rule to destroy said original packet after said duplicating and said routing of all of said each recipient of said plurality of recipients.

13. The method of broadcasting according to claim 11, wherein at an end of said routing, verifying an integrity of the at least one information packet to ensure the at least one information packet corresponds to the the IP address of said each recipient that is chosen from said metadata.

\* \* \* \* \*